United States Patent [19]

Reddy et al.

[11] 4,119,850

[45] Oct. 10, 1978

[54] MULTIPLE SAMPLE, RADIOACTIVE PARTICLE COUNTING APPARATUS

[75] Inventors: Reddy Reddy Venketeshwara Reddy, Deerfield; David Matthews Kelso, Wilmette, both of Ill.

[73] Assignee: Abbott Laboratories, North Chicago, Ill.

[21] Appl. No.: 784,899

[22] Filed: Apr. 5, 1977

[51] Int. Cl.² .................... G01T 1/00; H01J 3/14; G01T 1/20

[52] U.S. Cl. .................. 250/328; 250/237 R; 250/363 R

[58] Field of Search ............. 250/328, 363 S, 364, 250/366, 369, 370, 237 R, 237 G

[56] References Cited

U.S. PATENT DOCUMENTS

| | | | |
|---|---|---|---|
| 3,569,711 | 3/1971 | Stoms et al. | 250/394 |
| 3,578,980 | 5/1971 | Decker et al. | 250/237 G |
| 3,720,469 | 3/1973 | Harwit | 250/237 R |
| 4,005,292 | 1/1977 | Oesterlin et al. | 250/364 |

Primary Examiner—Alfred E. Smith
Assistant Examiner—Janice A. Howell
Attorney, Agent, or Firm—Merriam, Marshall and Bicknell

[57] ABSTRACT

Apparatus for determining the respective radioactive particle sample count being emitted from a plurality of radioactive particle containing samples, including modulation means for modulating the information on the radioactive particles being emitted from the samples, coded detecting means for sequentially detecting different respective coded combinations of the radioactive particles emitted from more than one but less than all of the samples, and processing the modulated information to derive the sample count for each sample. One embodiment includes a single light emitting crystal adjacent a plurality of samples, an encoder belt sequentially movable between the crystal and the samples, the encoder belt having a coded array of apertures to provide corresponding modulated light pulses from the crystal, and a photomultiplier tube to convert the modulated light pulses to corresponding decodable electrical signals for deriving the respective sample count.

13 Claims, 5 Drawing Figures

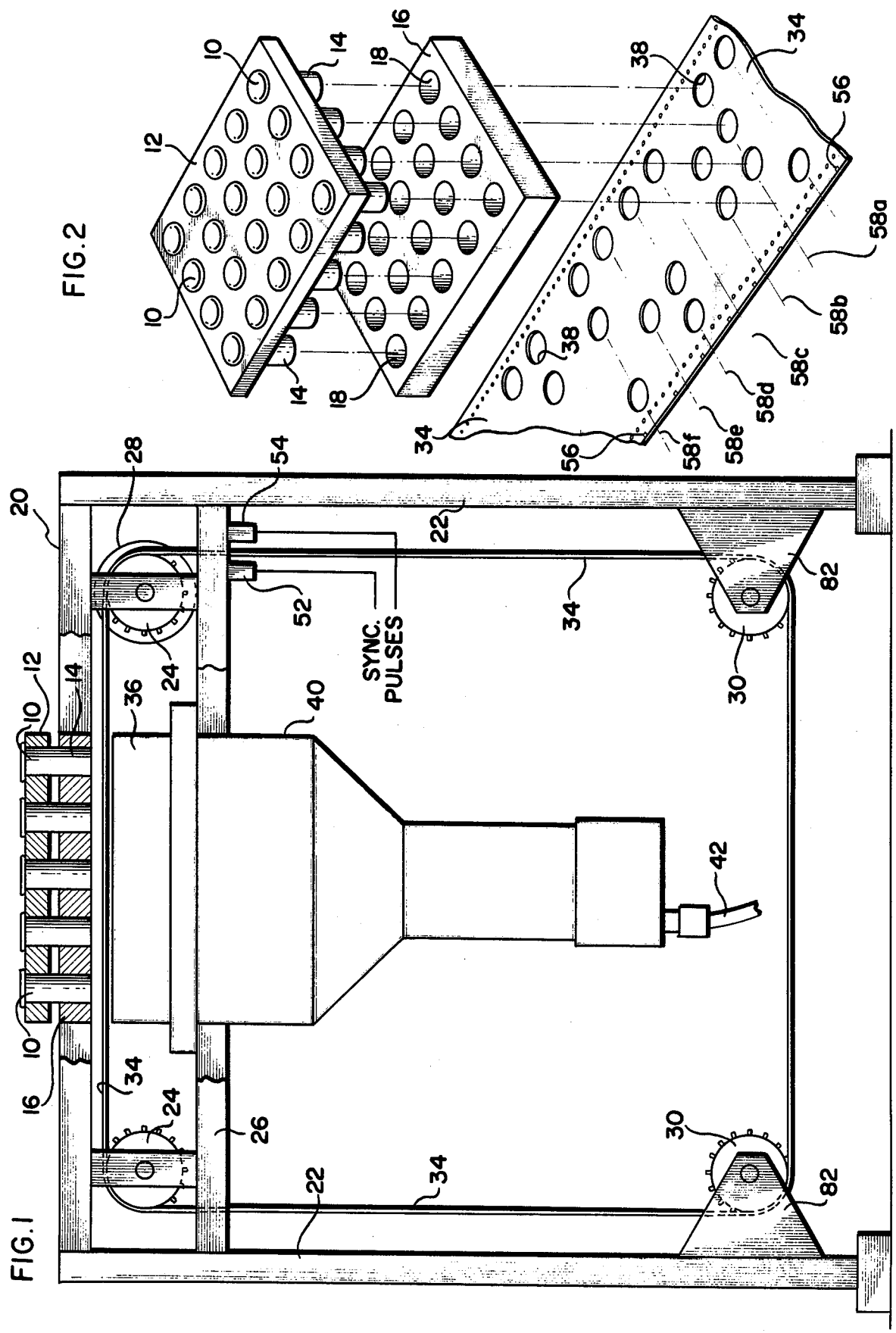

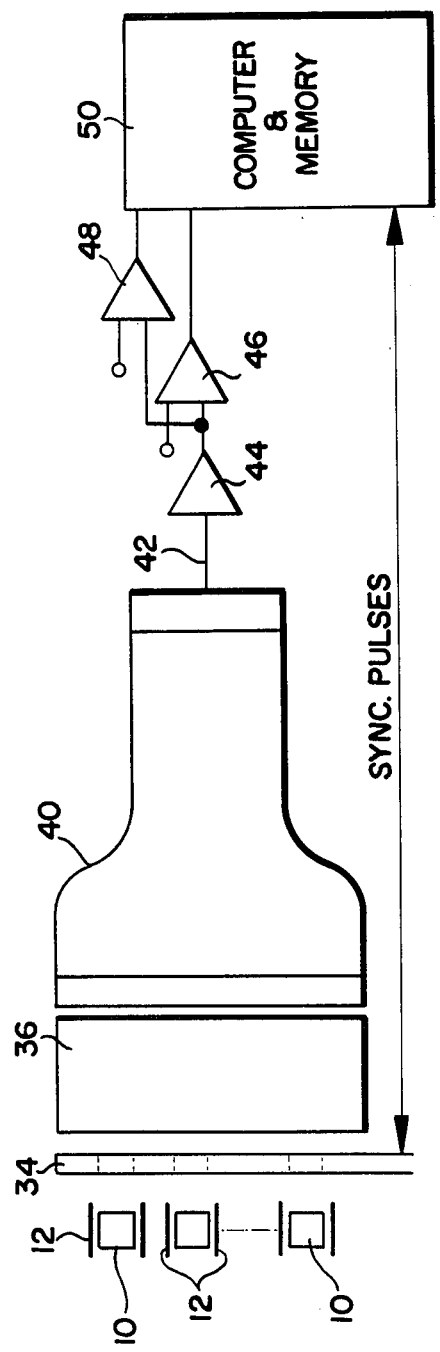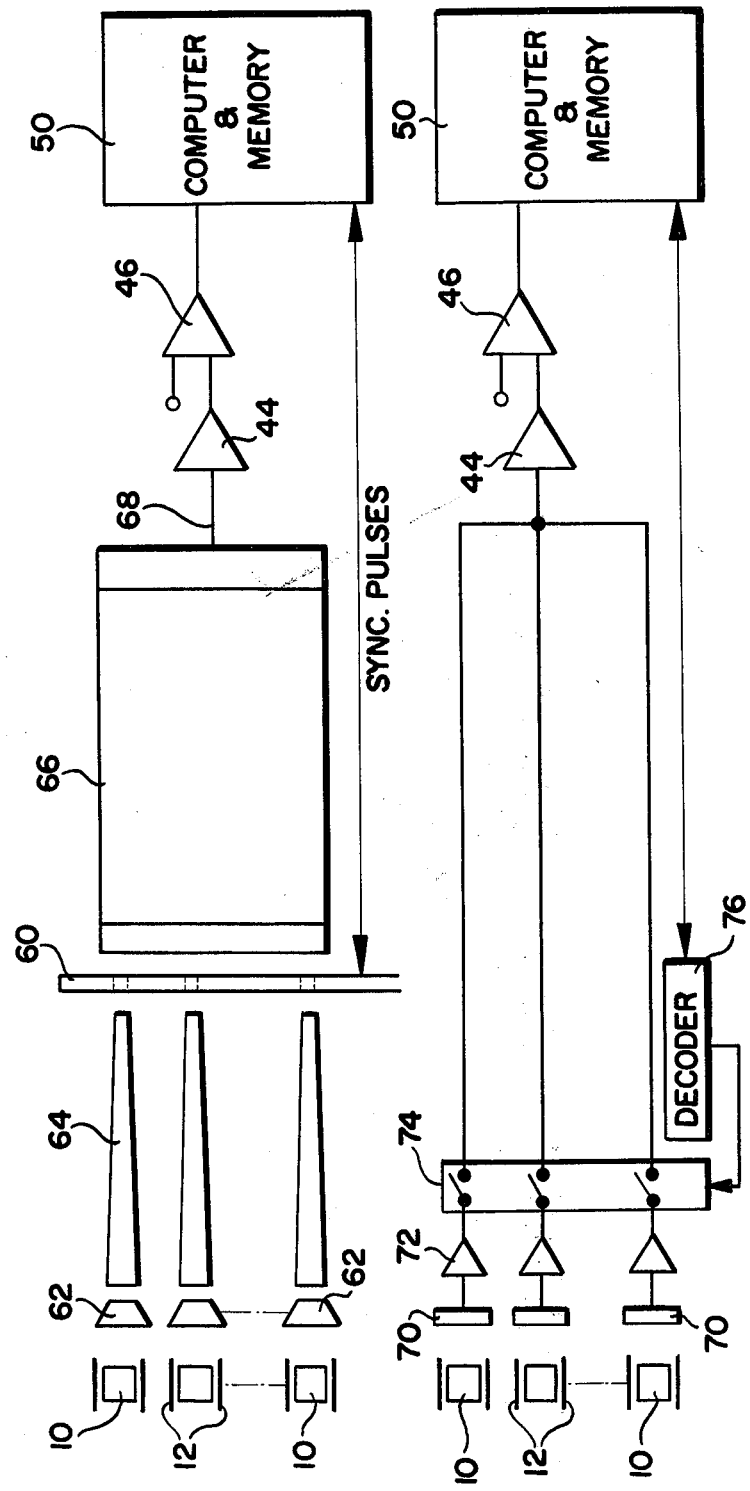

MULTIPLE SAMPLE, RADIOACTIVE PARTICLE COUNTING APPARATUS

This invention relates to radioactive particle counters and more particularly to apparatus for counting the respective radioactive particles eminating from a plurality of samples containing radioactive particles.

BACKGROUND OF THE INVENTION

Reference may be made to the following U.S. Pat. Nos. 3,509,339; 3,509,341; 3,578,960; 3,717,762; 3,720,469; and 3,578,980.

Several of the aforementioned patents illustrate diagnostic apparatus for analyzing a plurality of radioactive emitting samples and providing a sample count for a discrete sample. Generally, such systems detect the number of radioactive particles being emitted from each sample by utilizing a light emitting crystal, such as sodium iodide. The light pulses are converted by a photomultiplier tube into electrical pulse signals so that the sample count for each sample can be obtained. Whereas such systems are suitable for obtaining the sample count when only one sample is to be analyzed, a particular problem exists in the total length of time required to obtain a sample count for all samples where a plurality of samples are to be analyzed. This is due to the fact that the type of radioactive material normally utilized in such systems decays very slowly and the emitted gamma particles must be detected over a long time interval in order to obtain the degree of precision required in diagnostic instruments. It for example, approximately 10,000 counts are required to obtain a 1% precision, this would normally require approximately one minute of counting time per sample. Where there are a large number of samples to be analyzed, the total counting time becomes very significant, and it is highly desirable to obtain an overall reduction in the counting time without sacrificing the precision required of diagnostic instruments.

SUMMARY OF THE INVENTION

In accordance with the principles of the present invention, there is provided multiple sample, radioactive particle counter apparatus which significantly reduces the length of time required to provide a reliable sample count for each sample. The improved diagnostic apparatus includes a single light emitting crystal, such as a sodium iodide crystal, for simultaneously receiving the emitted radioactive particles from a plurality of samples in an array and providing a corresponding light output pulse to a photomultiplier tube for conversion to an electrical pulse signal corresponding to the detected radiation. An encoder belt formed of radiopaque material and having a series of aperture arrays in a predetermined coded configuration is mounted for interrupted or step movement between the sample array and the detecting crystal so that the radiation from the sample array is modulated in accordance with the coded combination. The modulated information at the output of the photomultiplier tube obtained during each sequential step movement of the encoder belt corresponding to the coded combination is utilized by computer means to derive the respective sample count for all samples in approximately the time previously required for one sample count. The present invention not only signficantly reduces the sample counting time, but also reduces the complexity of the detection equipment since only one light emitting crystal and one photomultiplier tube is required for the entire multiple sample array.

In an alternative embodiment of the invention, the modulated information is provided by an encoder belt of visible light-opaque material having coded aperture arrays. The light encoder belt is movably stepped between the light emitting detector crystals and the photomultiplier tube. The information derived from each stepwise movement of the encoder belt is processed in the same manner as the preferred embodiment to derive the respective sample count.

A further embodiment of the invention utilizes cadmium telluride crystal detectors directly responsive to the samples to provide a corresponding electrical pulse signal relating to the sample count. In this embodiment, the output signal of each crystal is modulated by sequentially operating a plurality of associated respective switches in accordance with a predetermined code, similar to the encoding technique previously described. Operating the switches couples selected combinations of detector output signals through the processing apparatus to derive the respective sample count.

The use of cyclic coded patterns for one-dimensional spectral analysis of a light image is described in the aforementioned U.S. Pat. No. 3,578,980, and an extension of the technique using two-dimensional cyclic coded patterns for spectral and spatial analysis of a light image is described in the aforementioned U.S. Pat. No. 3,720,469. This invention utilizes cyclic encoding of radioactive particle information emitted from multiple radioactive particle emitting samples to provide discrete analysis, such as a discrete gamma sample count, of the multiple samples. In the preferred embodiment there results a significant decrease in counting time for multiple samples and a very desirable simplification in the detection apparatus.

BRIEF DESCRIPTION OF THE DRAWINGS

FIG. 1 is a side elevational view of a preferred embodiment of the invention utilizing a belt encoder for modulating gamma radiation from radioisotopes in a plurality of samples to provide a multiple sample, radioactive particle counter;

FIG. 2 is a perspective view illustrating the alignment of a multiple sample array, a collimator member and a belt encoder portion of the apparatus shown in FIG. 1;

FIG. 3 is a schematic diagram of the diagnostic apparatus of FIG. 1, including an information processor to derive the respective sample count for each sample;

FIG. 4 is a schematic diagram illustrating an alternative embodiment of the present invention utilizing an optical encoder belt; and FIG. 5 is a schematic diagram illustrating still another alternative embodiment of the present invention utilizing semiconductor gamma ray detectors and modulation means for encoding the output of the detectors.

DETAILED DESCRIPTION

FIGS. 1–5 illustrate a preferred embodiment of the invention for detecting and measuring the respective gamma radiation emitted from discrete samples in a 20 sample array. Each sample containing radioactive particles is located within a cup or test tube 10 and releasably mounted for instance in a 4×5 matrix through suitable apertures on a tray 12. Alternatively, the cup or tube may be integrally formed as a cavity or well in the tray. As indicated in FIG. 2, the lower portion 14 of the sample test tubes project below the sample tray for insertion into a collimating member 16 having a series of 4×5 apertures 18 axially aligned with each sample tube 10. The collimating member 16 is formed of radiation opaque material such as virgin lead for shielding the samples and guiding the radiation. As can be seen from the cross-sectional assembled view of FIG. 1, the bottom portion 14 of each sample tube releasably mounts within the corresponding apertures of the collimating member 16. The collimating member 16 itself is mounted within a table platform 20 with the platform 20 being supported in turn by suitable table legs, such as the frame members 22. It is to be understood, of course, that the sample tray 12 is constructed so as to be releasably mounted with respect to the collimating member 16 as desired.

A pair of upper spockets 24 are supported on a shelf 26 suitably mounted between the frame legs below the platform 20, with one of the spockets 24 being driven by a motor 28. Two lower spockets 30 are rotatably mounted on suitable brackets 82, the motor and spockets being provided to drive encoder belt 34 interposed between the sample tubes 10 and the detector or scintillator 36. The detector 36 is a light emitting crystal, such as a sodium iodide crystal, which receives the gamma radiation particles and emits a corresponding burst of light.

The encoder belt 34 is formed of a radiopaque material so as to attenuate and preferably block the gamma radiation from the sample matrix except in the location of apertures 38. As can be seen from FIG. 2, the apertures 38 are aligned with corresponding sample tube positions in the sample matrix. The presence or absence of an aperture thus modulates the information pertaining to the gamma radiation being emitted from the sample matrix in accordance with a predetermined cyclic coded combination so that an accurate measurement of the discrete sample radiation can be derived in significantly less time than is normal for radiation counters presently in use. The details of the encoder technique will be described in more particular hereinafter.

A photomultiplier tube 40 is suitably mounted on shelf 26 immediately below and adjacent the light emitting crystal 36 for receiving the emitted light and providing a corresponding electrical pulse signal on output line 42 for coupling to the counting apparatus schematically indicated in FIG. 3. The pulse signal output from photomultiplier 40 coupled via line 42 is amplified in preamplifier 44 and applied to a lower level pulse discriminator 46 and to an upper level pulse discriminator 48. As illustrated in FIG. 3, each of the discriminators 46 and 48 includes suitable threshold level and "window" control so as to couple to the computer and memory unit 50, pulse signals from line 42 having a level between the discriminating levels imposed by the discriminators 46 and 48, in a known manner.

The encoder belt 34 is driven by motor 28 under control of synchronizing pulse signals provided by the computer 50 as derived from information supplied by belt position means. With reference to FIG. 1, a suitable belt position means is shown as including, for instance, a light emitting diode 52 emitting light to be detected by photo detector 54, both of which may be suitably mounted to shelf support 26. The light emitting diode 52 and photo detector 54, are mounted on each side of the encoder belt 34 and aligned with a series of belt positioning apertures 56 provided on one edge of the encoder belt 34. Motor 28 will drive the encoder belt 34 until the light from the light source 52 passes through an aperture 56 and is detected by detector 54, at which time the motor is deenergized and the belt stops for the collection of sample information during a preset time interval. At the end of the time interval the motor is again energized to drive the belt until it is again stopped at the next belt positioning aperture. This provides the interrupted or step movement of the belt.

The belt positioning apertures 56 are positioned on the encoder belt 34 such that the belt is interruptedly moved in steps so as to successively place adjacent information line segments of the belt, such as information line segment 58, in line with each row of sample tubes 10. Thus, the computer and memory unit 50 receives during each preset time interval following the interrupted belt movement, modulated information pertaining to the entire 4×5 sample matrix. For example, in the encoder belt position shown in FIG. 2, information on all 20 samples is encoded during the preset time interval in accordance with the predetermined, coded opaque and transparent (aperture) portions on information line segments 58a through 58e. The encoder belt 34 is then moved by motor 28 until it is stopped at the next belt positioning aperture and information on all of the samples is then encoded in accordance with the coded information line segments 58b through 58f.

As can be seen from FIG. 2, the array of information line segments 58a–58e present 20 information positions—four per each line segment corresponding to the opaque or transparent (aperture) positions on each line. Line segment 58a presents three apertures and one opaque; 58b presents two apertures and two opaque; 58c presents one aperture and three opaque; 58d presents three apertures and one opaque; and 58e presents two apertures and two opaque. Therefore, in this instance gamma radiation relating to 11 of the 20 samples is presented for processing. Next, the encoder belt 34 is interruptedly moved so that information line segments 58b to 58f are aligned with the samples to similarly present gamma radiation relating to another 11 of the 20 samples for processing. Sequential interrupted movement of the belt continues until this cyclic information on 20 different, predetermined coded 11 out of 20 combinations presented on 24 information line segments 58 on the encoder belt is obtained by the computer 50 for the 20 sample matrix described herein. Since the cyclic sequence can be described by a set of 20 equations involving the known, predetermined 20 coded combinations, the measured count for each of the 20 coded combinations, and the unknown sample count for each sample, the computer 50 can readily solve the simultaneous equations to determine the unknown, respective sample count. The resulting respective sample counts can be displayed and/or printed, as desired. More than 20 cycles of information on encoder 34 could be obtained to somewhat increase the measuring accuracy, however, this would of course involve additional measuring time.

In a constructed working model embodiment of the invention of the type illustrated in FIGS. 1-3, the respective sample counts for each sample in a 20 sample matrix was obtained in a total of 2.5 minutes. The encoder belt was interruptedly moved at a rate of 1 line segment per second with stops of 6 seconds and the measuring accuracy for this initial working model was within 5% of the independently measured value for each sample. In contrast, the total time for independently measuring each of the samples amounted to 20 minutes, disregarding the time of about 2 minutes required for changing 20 independent samples.

The constructed working model of the type illustrated in FIG. 1, had physical dimensions of about one foot in height and about eight inches in length and width. The tray 12 was formed of polypropylene with 20 integrally formed tubes 10 of about 7/16 inch in diameter in a 5×4 array. Collimator 16 was of virgin lead having 20 apertures 18 of about ⅜ inch in diameter. The encoder belt 34 was constructed of a flexible lead vinyl about 1/16 inch thick having apertures 38 of about ⅜ inch in diameter with centers spaced about ¾ inch each way. Twenty different cyclic coded combinations on the encoder belt were provided by 23 line segments 58 of the type shown in FIG. 2, but in this case, each line segment having five information positions rather than four since the sample array was 5×4 as opposed to the 4×5 of FIG. 2. Such cyclic coded combinations can be readily derived by those skilled in the art particularly in view of the aforementioned U.S. Pat. Nos. 3,578,980 and 3,720,469, illustrating cyclic coded combinations in light image spectral and spatial analysis. Rather than the sprocket drive in FIG. 2, friction feed rollers were used to drive the belt with the belt return portion being above the platform 20 instead of below the shelf 26 as shown in FIG. 2. A 2 inch thick sodium iodide crystal 36 was utilized.

FIG. 4 illustrates an alternative embodiment of the invention wherein light information is modulated by an optical belt encoder 60. The light corresponds to the gamma radiation received by the light emitting crystals 62 and is conducted through corresponding optical conducting elements 64. The output of a photomultiplier tube 66 provides electrical signals on line 68 which can be analyzed in the same manner as indicated in connection with the preferred embodiment of FIGS. 1-3. The optical belt encoder 60 is cyclically coded and is of course synchronously, interruptedly step driven in the same manner as previously indicated for the gamma ray belt encoder 34.

FIG. 5 schematically illustrates still another embodiment of the invention. A plurality of cadmium telluride crystals 70 or similar types of semiconductor detectors receive gamma radiation from respective samples 10 and provide a corresponding electrical pulse signal through suitable preamplifiers 72 to a respective switch in switch matrix 74. A switch decoder-driver 76 is controlled by control means in computer 50 to sequentially select a predetermined, cyclic coded combination of switches in switch matrix 74 to present the corresponding encoded information as previously described to computer 50 for processing. For example, for the 20 sample matrix of FIGS. 1-3, the decoder 76 would be directed to operate a coded 11 out of 20 switches in switch matrix 74, and to sequentially select a different 11 out of 20 switches each time until a total of 20 readings or counts have been obtained and processed in computer 50.

The foregoing detailed description has been given for clearness of understanding only, and no unnecessary limitations should be understood therefrom, as modifications will be obvious to those skilled in the art.

What is claimed is:

1. Apparatus for determining the respective radioactive particle sample count being emitted from a plurality of radioactive particle containing samples, said apparatus comprising:

modulation means for modulating the information corresponding to the radioactive particles being emitted from said plurality of samples;

said modulation means including coded detecting means for sequentially detecting different respective coded combinations of the radioactive particles emitted from more than one but less than all of said plurality of samples to provide said modulation information;

each respective coded combination of the radioactive particles emitted from more than one but less than all of said plurality of samples being obtained in a distinct detection sequence enabled by said coded detecting means; and said coded detecting means enabling a series of said distinct detection sequences to sequentially detect at least as many of said different respective coded combinations as the number of said samples being analyzed;

means for processing said modulated information to derive the respective sample count for each sample.

2. Apparatus according to claim 1, wherein said different respective coded combinations are in the form of a cyclic code.

3. Apparatus for determining the respective radioactive particle sample count being emitted from a plurality of radioactive particle containing discrete samples in an array, said apparatus comprising:

a light emitting detector adjacent said array of samples responsive to the sample emitted radioactive particles to emit light pulses corresponding to the received radioactive particle information;

encoder means intermediate said sample array and said light emitting detector to modulate said radioactive particle information to enable said detector to sequentially respond to different respective coded combinations of the radioactive particles emitted from more than one but less than all of said plurality of samples in the sample array to provide correspondingly modulated light pulses;

said encoder means including movable coded means sequentially movable, in distinct coding sequences, between said sample array and said light emitting detector for sequentially blocking the radioactive particles emitted from more than one but less than all of said plurality of samples in accordance with said different respective coded combinations each associated with one of said distinct coding sequences;

said movable coded means movable in a series of said distinct coding sequences to enable said detector to sequentially respond to at least as many of said different coded combinations as the number of samples being analyzed; and conversion means responsive to said emitted light pulses from said detector in each of said distinct coding sequences to provide corresponding decodable electrical signals for deriving said respective sample count.

4. Apparatus according to claim 3, wherein said movable coded means includes an encoder belt having a coded array of apertures aligned with respective samples, enabling said radioactive particles emitting from said respective samples to impinge on said detector in said different respective coded combinations, the radioactive particles emitted from the other samples being blocked from said detector.

5. Apparatus according to claim 4, wherein said encoder means includes means for sequentially moving said encoder belt with respect to said samples and detector to align said coded array of apertures with different respective samples.

6. Apparatus according to claim 5, wherein said coded array of apertures on said encoder belt are in the form of a cyclic code.

7. Apparatus according to claim 3, including processing means to decode said electrical signals and derive said respective sample count.

8. Apparatus according to claim 3, wherein said detector includes a sodium iodide crystal.

9. Apparatus for determining the respective radioactive particle sample count being emitted from a plurality of radioactive particle containing discrete samples in an array, said apparatus comprising:

a tray having a plurality of sample positions for containing said plurality of samples in said array;

a collimator member below said tray having a plurality of slots, one for each of said samples insertable therein;

a sodium iodide crystal mounted below said collimator member and adjacent said samples;

said crystal responsive to the radioactive particles emitted from said samples to emit light pulses corresponding to the received radioactive particle information;

an encoder belt mounted for sequential movement between said sample array and said sodium iodide crystal to provide distinct coding sequences;

said encoder belt formed of a substantially radiopaque material and having a coded series of apertures to encode said radioactive particle information and enable said crystal to sequentially respond to different respective coded combinations of the radioactive particles emitted from more than one but less than all of said plurality of samples in the sample array;

each of said coded combinations being associated with one of said distinct coding sequences, and the number of said distinct coding sequences being at least equal to the number of said samples being analyzed; and conversion means, including a photodetector mounted below said crystal and responsive to the emitted light pulses from said crystal, to provide corresponding decodable electrical signals for deriving said respective sample count.

10. Apparatus for determining the respective radioactive particle sample count being emitted from a plurality of radioactive particle containing discrete samples in an array, said apparatus comprising:

a plurality of light emitting detectors, each immediately adjacent one of said samples and responsive to the respective radioactive particles emitted from said sample to emit light pulses corresponding to the received respective radioactive particle information;

encoder means in the path of said emitted light pulses to modulate said light pulses to correspond to sequentially different respective coded combinations of the radioactive particles emitted from more than one but less than all of said plurality of samples in the sample array;

said encoder means including movable coded means sequentially movable, in a series of distinct coding sequences, between said sample array and said plurality of light emitting detectors for sequentially blocking the radioactive particles emitted from more than one but less than all of said plurality of samples in accordance with said different respective coded combinations each associated with one of said distinct coding sequences;

the number of said distinct coding sequences being at least equal to the number of samples being analyzed; and conversion means responsive to said modulated light pulses from said encoder means to provide corresponding decodable electrical signals for deriving said respective sample count.

11. Apparatus according to claim 10, including a plurality of light conducting elements, one for each of said samples, said light conducting elements each having one end adjacent a respective sample and another end adjacent said encoder means so as to guide said emitted light pulses therebetween.

12. Apparatus according to claim 10, wherein said movable coded means includes a sequentially movable encoder belt having a coded array of apertures aligned with a respective light emitting detector, enabling said light pulses to be coupled to said conversion means in said sequentially different respective coded combinations, the radioactive particles emitted from the other samples being blocked from said conversion means.

13. Apparatus for determining the respective radioactive particle sample count being emitted from a plurality of radioactive particle containing discrete samples in an array, said apparatus comprising:

a plurality of detectors, each immediately adjacent one of said samples and responsive to the respective radioactive particles emitted from said sample to emit electrical pulse signals corresponding to the received respective radioactive particle information;

switch encoder means, including a plurality of switches each coupled to a respective detector for receiving the associated electrical pulse signal, and said switch means including means for selectively operating said switches in a series of distinct coding sequences each corresponding to sequentially different respective coded combinations of the radioactive particles emitted from more than one but less than all of said plurality of samples in the sample array to provide decodable electrical signals for deriving said respective sample count;

the number of said different respective coded combinations corresponding to at least as many as the number of said samples being analyzed.

* * * * *